US012296589B2

(12) United States Patent
Shiozawa et al.

(10) Patent No.: US 12,296,589 B2
(45) Date of Patent: May 13, 2025

(54) LIQUID DISCHARGE HEAD AND LIQUID DISCHARGE DEVICE

(71) Applicant: SEIKO EPSON CORPORATION, Tokyo (JP)

(72) Inventors: Yu Shiozawa, Shiojiri (JP); Masaki Mori, Shiojiri (JP); Motoki Takabe, Shiojiri (JP); Hitoshi Takaai, Azumino (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/059,878

(22) Filed: Nov. 29, 2022

(65) Prior Publication Data

US 2023/0166506 A1 Jun. 1, 2023

(30) Foreign Application Priority Data

Nov. 30, 2021 (JP) ................................ 2021-194017

(51) Int. Cl.
*B41J 2/14* (2006.01)
*B41J 2/045* (2006.01)

(52) U.S. Cl.
CPC ....... *B41J 2/14233* (2013.01); *B41J 2/04581* (2013.01); *B41J 2002/14362* (2013.01); *B41J 2002/14459* (2013.01); *B41J 2002/14491* (2013.01)

(58) Field of Classification Search
CPC .................................................... B41J 2/04563
See application file for complete search history.

(56) References Cited

U.S. PATENT DOCUMENTS

2003/0214564 A1* 11/2003 Miyata .................... B41J 2/1629 347/72
2012/0229573 A1* 9/2012 Mizukami ............ B41J 2/14233 347/50
2014/0043401 A1* 2/2014 Torimoto ................. B41J 2/055 347/71
2015/0109370 A1* 4/2015 Chowdhury ........... B41J 2/1601 347/56
2015/0266295 A1* 9/2015 Miyazaki ............... B41J 2/1646 347/71

(Continued)

FOREIGN PATENT DOCUMENTS

JP 2011-104916 A 6/2011

*Primary Examiner* — Shelby L Fidler
(74) *Attorney, Agent, or Firm* — WORKMAN NYDEGGER

(57) ABSTRACT

A liquid discharge head includes an individual electrode that is individually provided for the plurality of pressure chambers, a common electrode that is commonly provided for the plurality of pressure chambers, a piezoelectric body that is provided between the individual electrode and the common electrode for applying pressure to liquid in the pressure chambers, a drive wiring that is electrically coupled to the individual electrode and the common electrode, and applies a voltage for driving the piezoelectric body, a detection resistor that is formed of the same material as any of the individual electrode, the common electrode, and the drive wiring for detecting temperature of the liquid in the pressure chambers, and a first layer that is provided on a surface opposite to a surface facing the pressure chamber substrate in the detection resistor, and has a lower thermal conductivity than the detection resistor.

16 Claims, 11 Drawing Sheets

(56) References Cited

U.S. PATENT DOCUMENTS

| | | | | |
|---|---|---|---|---|
| 2018/0264807 | A1* | 9/2018 | Ito | B41J 2/161 |
| 2021/0008878 | A1* | 1/2021 | Nagamochi | B41J 2/16579 |
| 2021/0086508 | A1* | 3/2021 | Ishiwata | B41J 2/04573 |

* cited by examiner

LIQUID DISCHARGE HEAD AND LIQUID DISCHARGE DEVICE

The present application is based on, and claims priority from JP Application Serial Number 2021-194017, filed Nov. 30, 2021, the disclosure of which is hereby incorporated by reference herein in its entirety.

BACKGROUND

1. Technical Field

The present disclosure relates to a liquid discharge head and a liquid discharge device.

2. Related Art

A liquid discharge device having a temperature detection section on the side surface of a carriage on which a liquid discharge head is mounted is known (for example, JP-A-2011-104916). The liquid discharge device changes the number of maintenance drive pulses applied to a piezoelectric element based on an environmental temperature detected by the temperature detection section.

However, when the temperature detection section is provided outside the liquid discharge head, there is a possibility that temperature detection accuracy of the ink in a pressure chamber decreases. Therefore, there is a demand for disposing the temperature detection section in the vicinity of the pressure chamber in the liquid discharge head. Therefore, the inventors have newly found that the temperature of the ink in the pressure chamber is acquired by disposing resistance wiring inside the liquid discharge head and using the correspondence relationship between the resistance value of the resistance wiring and the temperature. However, it is desired to improve the temperature detection accuracy by the resistance wiring disposed inside the liquid discharge head.

SUMMARY

According to a first aspect of the present disclosure, there is provided a liquid discharge head. According to an aspect of the present disclosure, there is provided a liquid discharge head including a pressure chamber substrate that is provided with a plurality of pressure chambers, an individual electrode that is individually provided for the plurality of pressure chambers, a common electrode that is commonly provided for the plurality of pressure chambers, a piezoelectric body that is provided between the individual electrode and the common electrode for applying pressure to liquid in the pressure chambers, a drive wiring that is electrically coupled to the individual electrode and the common electrode, and applies a voltage for driving the piezoelectric body, a detection resistor that is formed of the same material as any of the individual electrode, the common electrode, and the drive wiring for detecting temperature of the liquid in the pressure chambers, and a first layer that is provided on a surface opposite to a surface facing the pressure chamber substrate in of the detection resistor, and has a lower thermal conductivity than the detection resistor.

According to a second aspect of the present disclosure, there is provided a liquid discharge device. The liquid discharge device includes the liquid discharge head according to the first aspect, and a control section that controls a discharge operation of the liquid discharge head.

DESCRIPTION OF EXEMPLARY EMBODIMENTS

A. First Embodiment

Figure 1:
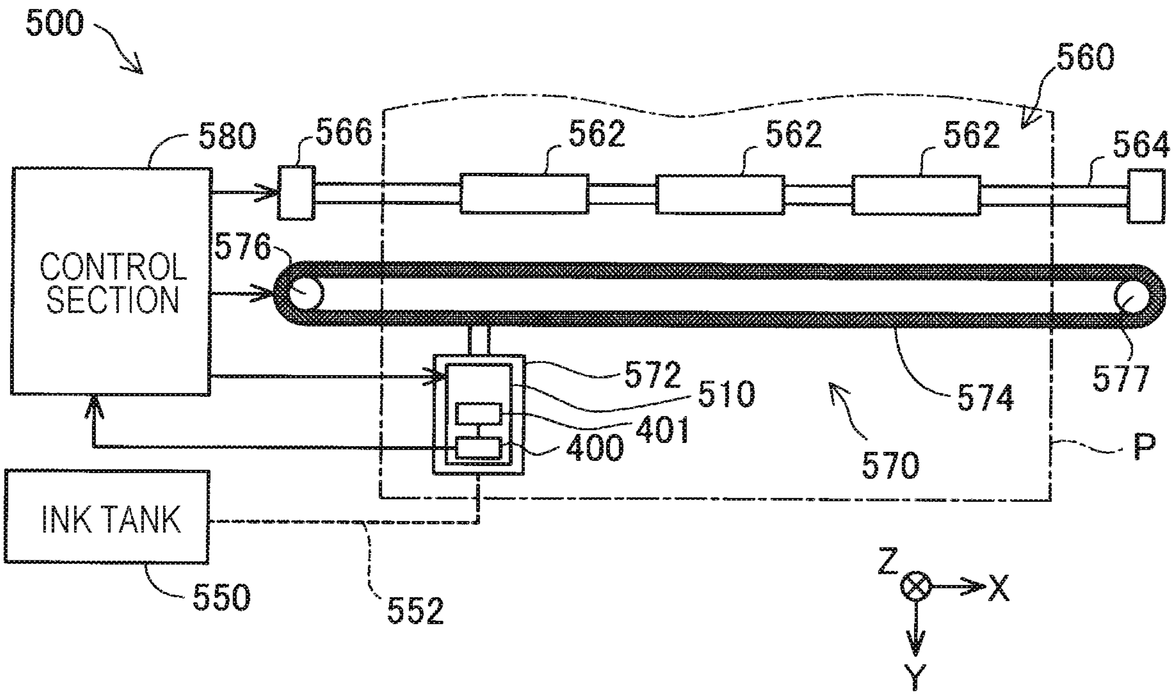
FIG. 1 is an explanatory view showing a schematic configuration of a liquid discharge device as a first embodiment of the present disclosure.

FIG. 1 is an explanatory view showing a schematic configuration of a liquid discharge device 500 as a first embodiment of the present disclosure. In the present embodiment, the liquid discharge device 500 is an ink jet printer that discharges ink as an example of a liquid onto printing paper P to form an image. The liquid discharge device 500 may use any kind of medium, such as a resin film or a cloth, as an ink discharge target, instead of the printing paper P. X, Y, and Z shown in FIG. 1 and each of the drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be performed while a direction to which an arrow faces in each of the drawings is the + direction and an opposite direction thereof is the − direction. In the present embodiment, the Z direction coincides with a vertical direction, the +Z direction indicates vertically downward, and the −Z direction indicates vertically upward. Further, when the positive direction and the negative direction are not limited, the three X, Y, and Z will be described as the X axis, the Y axis, and the Z axis.

As shown in FIG. 1, the liquid discharge device 500 includes a liquid discharge head 510, a temperature acquisition section 400, an ink tank 550, a transport mechanism 560, a moving mechanism 570, and a control section 580. The liquid discharge head 510 has a detection resistor 401. In the present embodiment, the temperature acquisition section 400 is included in the liquid discharge head 510. The liquid discharge head 510 is formed with a plurality of nozzles, discharges inks of a total of four colors, for example, black, cyan, magenta, and yellow in the +Z direction to form an image on a printing paper P. The liquid discharge head 510 is mounted on the carriage 572 and reciprocates in a main scanning direction with the movement of the carriage 572. In the present embodiment, the main scanning directions are the +X direction and the −X direction. The liquid discharge head 510 may further discharge ink of a random color such as light cyan, light magenta, or white, while not being limited to the four colors.

The ink tank 550 accommodates the ink to be discharged to the liquid discharge head 510. The ink tank 550 is coupled to the liquid discharge head 510 by a resin tube 552. The ink in the ink tank 550 is supplied to the liquid discharge head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration, in which a plurality of transport mechanisms 560 are provided, may be provided.

The moving mechanism 570 includes a transport belt 574, a moving motor 576, and a pulley 577, in addition to the carriage 572. The carriage 572 mounts the liquid discharge head 510 in a state where the ink can be discharged. The carriage 572 is fixed to the transport belt 574. The transport belt 574 is bridged between the moving motor 576 and the pulley 577. When the moving motor 576 is rotatably driven, the transport belt 574 reciprocates in the main scanning direction. As a result, the carriage 572 fixed to the transport belt 574 also reciprocates in the main scanning direction.

The control section 580 controls the entire liquid discharge device 500. The control section 580 controls, for example, a reciprocating operation of the carriage 572 along the main scanning direction, a transport operation of the printing paper P along the sub-scanning direction, and a discharge operation of the liquid discharge head 510. The control section 580 includes, for example, one or a plurality of processing circuits such as a Central Processing Unit (CPU) or a Field Programmable Gate Array (FPGA), and one or a plurality of storage circuits such as a semiconductor memory.

Figure 2:
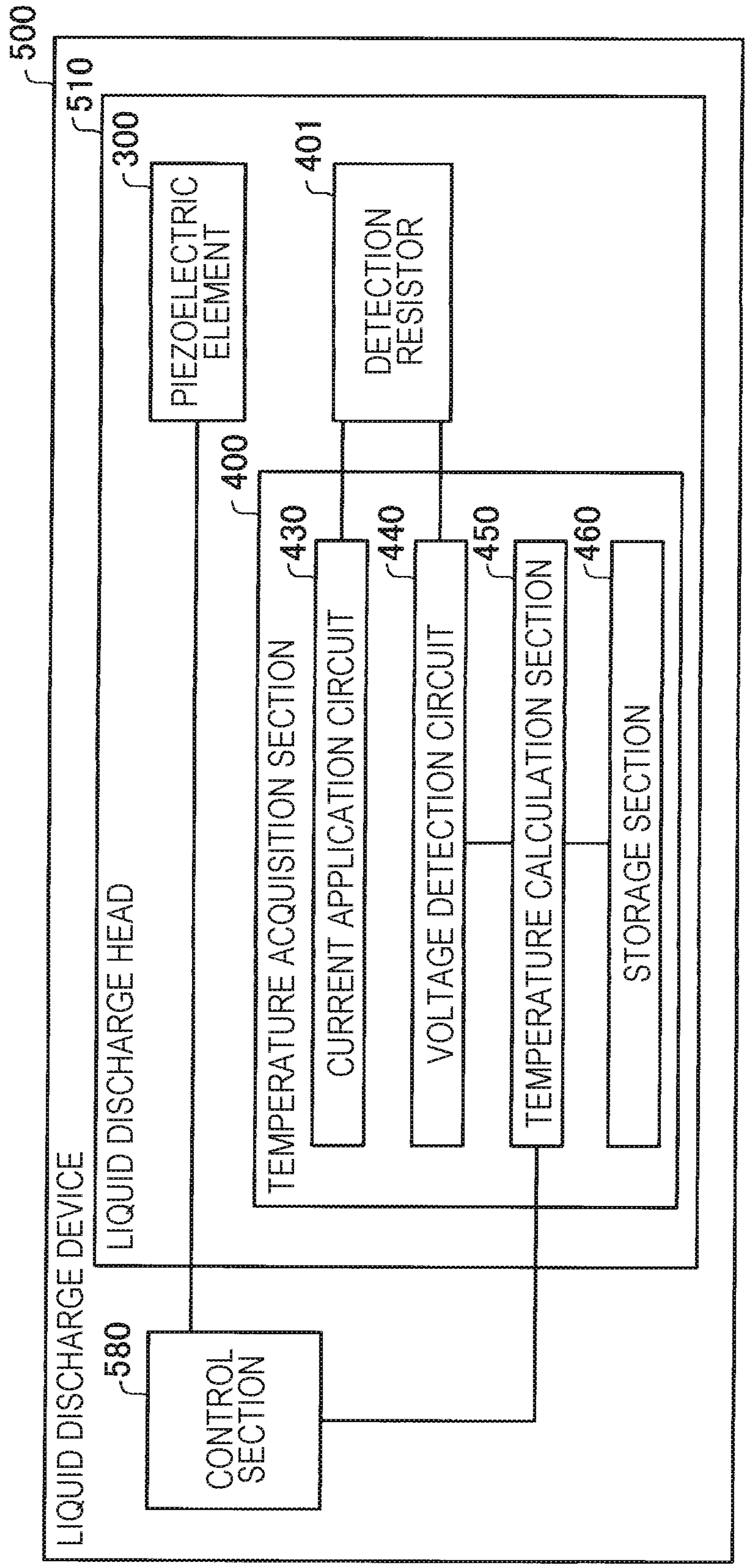
FIG. 2 is a block diagram showing a functional configuration of the liquid discharge device.

FIG. 2 is a block diagram showing a functional configuration of the liquid discharge device 500. In FIG. 2, the configurations of the ink tank 550, the transport mechanism 560, and the moving mechanism 570 are omitted. The liquid discharge head 510 of the present embodiment includes a piezoelectric element 300, a detection resistor 401, and a temperature acquisition section 400.

The piezoelectric element 300 causes a pressure change in the ink in the pressure chamber of the liquid discharge head 510. The detection resistor 401 is a resistance wiring used for detecting the temperature of the pressure chamber, as will be described later. The temperature acquisition section 400 estimates the temperature of the ink in the pressure chamber by detecting the temperature of the detection resistor 401 by utilizing the characteristic that the electric resistance value of the resistance wiring of metal, semiconductor, or the like changes depending on the temperature. The temperature acquisition section 400 includes a current application circuit 430, a voltage detection circuit 440, a temperature calculation section 450, and a storage section 460.

The current application circuit 430 applies a current to the detection resistor 401. In the present embodiment, the current application circuit 430 is a constant current circuit which causes a predetermined constant current to flow through the detection resistor 401. The voltage detection circuit 440 detects the voltage value of the voltage generated in the detection resistor 401 by applying the current.

As the storage section 460, for example, a non-volatile memory, such as EEPROM, which can be erased by an electric signal, a non-volatile memory, such as One-Time-PROM or EPROM, which can be erased by ultraviolet rays, and a non-volatile memory, such as PROM, which cannot be erased can be used. The storage section 460 stores various programs for realizing functions provided by the temperature acquisition section 400 in the present embodiment. The CPU of the temperature acquisition section 400 functions as the temperature calculation section 450 by executing various programs stored in the storage section 460.

The temperature calculation section 450 acquires the electric resistance value of the detection resistor 401 and calculates the temperature of the pressure chamber. Specifically, the temperature calculation section 450 acquires the resistance value of the detection resistor 401 based on the current value of the current applied to the detection resistor 401 from the current application circuit 430 and the voltage value of the voltage generated in the detection resistor 401 by applying the current. The temperature calculation section 450 calculates the temperature of the pressure chamber by using the acquired resistance value of the detection resistor 401 and a temperature calculation formula stored in the storage section 460. The temperature calculation formula shows the correspondence relationship between the electric resistance value of the detection resistor 401 and the temperature.

The temperature acquisition section 400 outputs the detected temperature of the pressure chamber to the control section 580. The control section 580 controls the discharge of the ink to the printing paper P by outputting a drive signal based on the temperature of the pressure chamber acquired from the temperature acquisition section 400 to the liquid discharge head 510 to drive the piezoelectric element 300.

Figure 3:
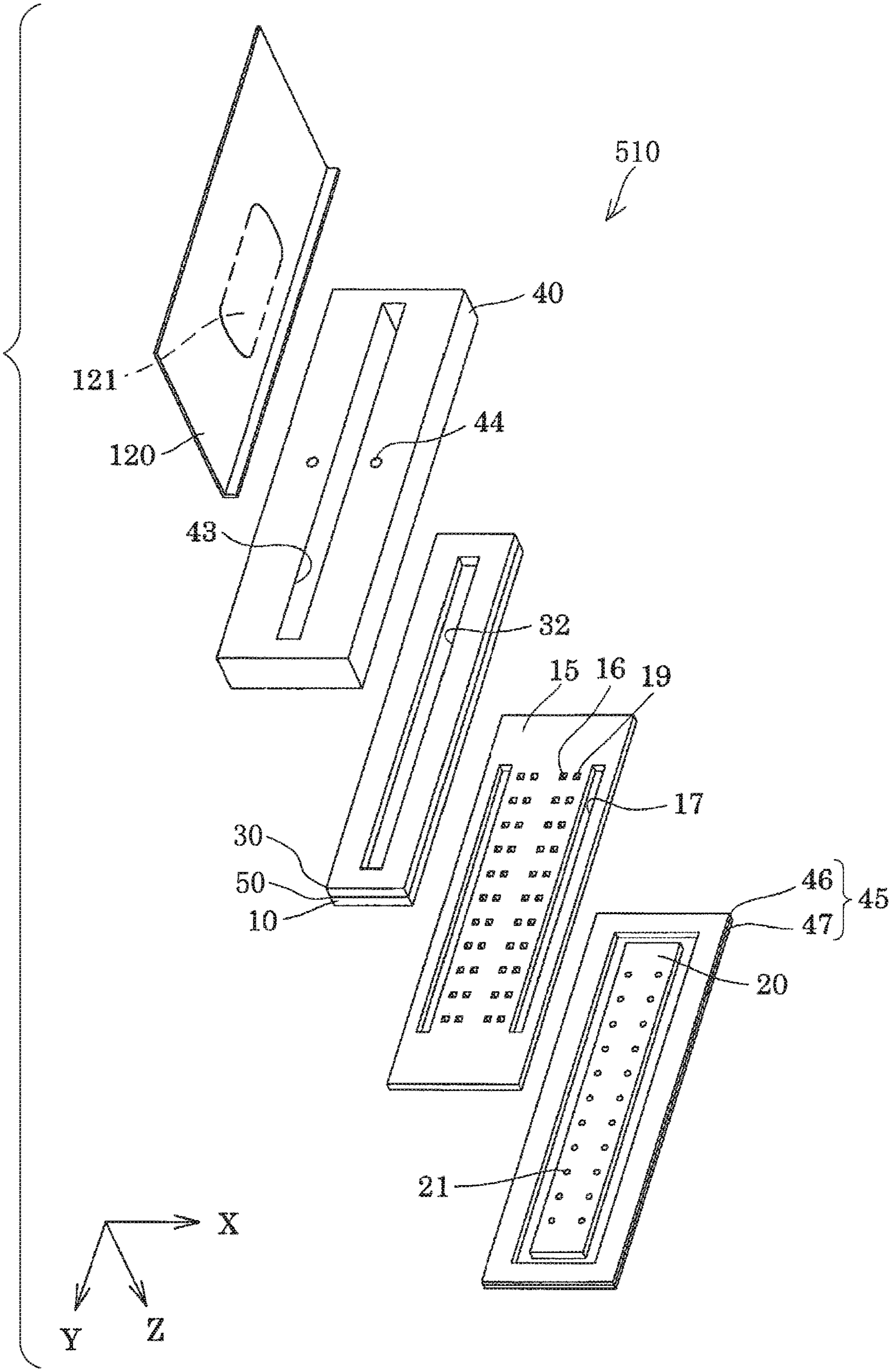
FIG. 3 is an exploded perspective view showing a configuration of a liquid discharge head.
Figure 4:
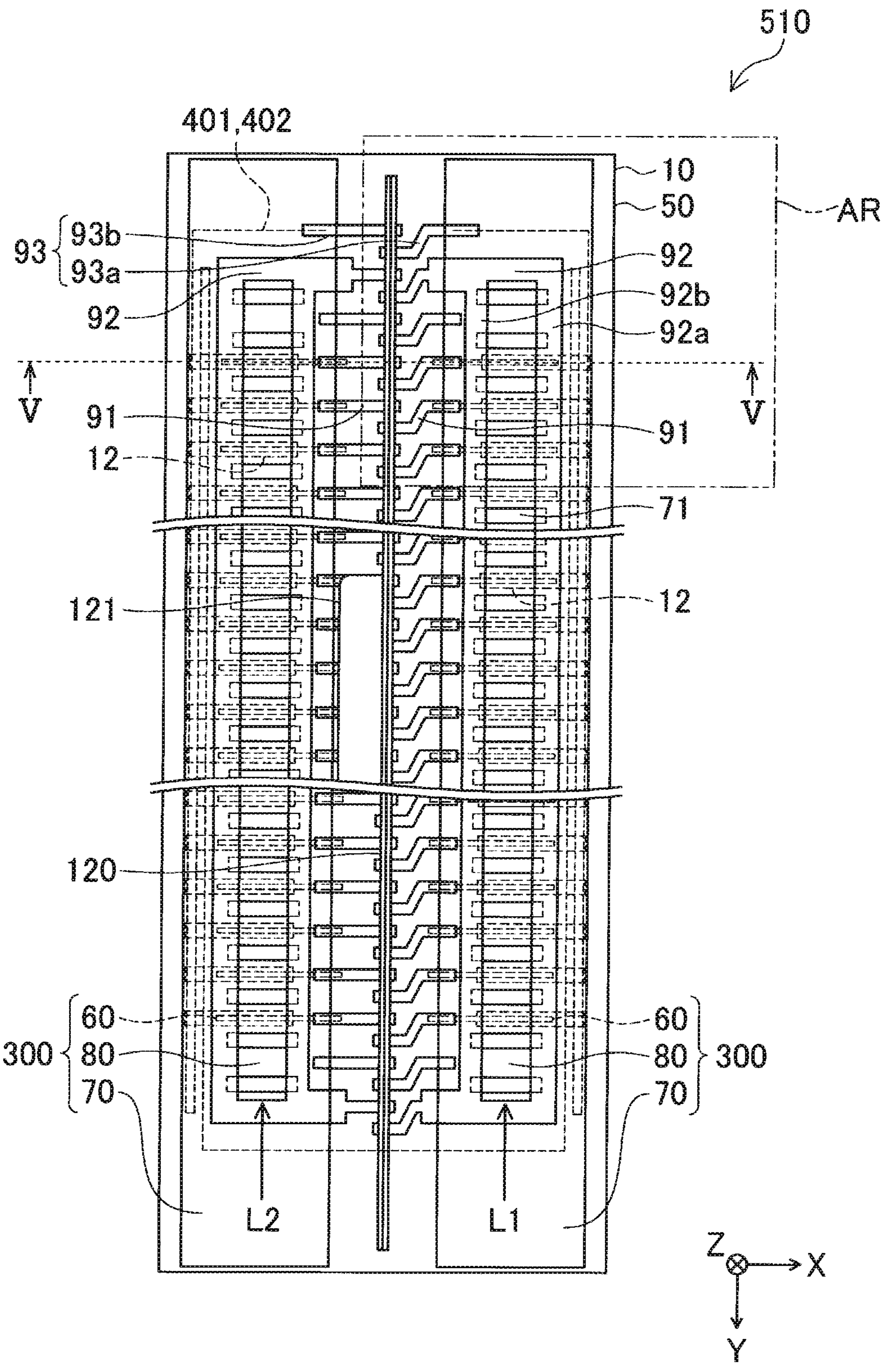
FIG. 4 is an explanatory view showing a configuration of the liquid discharge head in a plan view.
Figure 5:
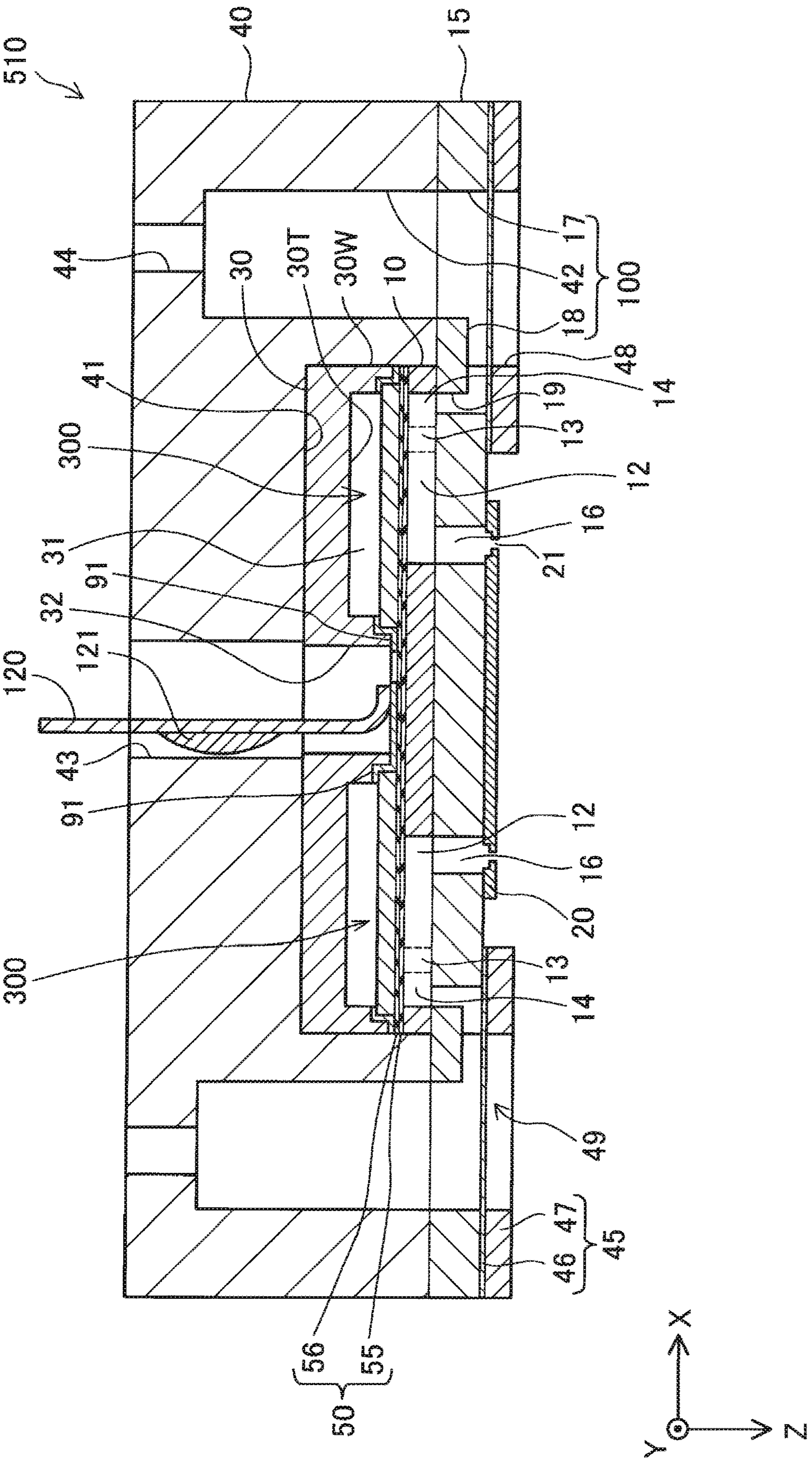
FIG. 5 is a cross-sectional view showing a V-V position of FIG. 4.

A detailed configuration of the liquid discharge head 510 will be described with reference to FIGS. 3 to 5. FIG. 3 is an exploded perspective view showing the configuration of the liquid discharge head 510. FIG. 4 is an explanatory view showing the configuration of the liquid discharge head 510 in a plan view. FIG. 4 shows a configuration in the vicinity of a pressure chamber substrate 10 in the liquid discharge head 510. In FIG. 4, a protective substrate 30 and a case member 40 are omitted for easy understanding of the technique. FIG. 5 is a cross-sectional view showing a V-V position of FIG. 4.

As shown in FIG. 3, the liquid discharge head 510 includes a pressure chamber substrate 10, a communication plate 15, a nozzle plate 20, a compliance substrate 45, a protective substrate 30, a case member 40, a diaphragm 50, and a relay substrate 120, and further includes a piezoelectric element 300 shown in FIG. 4. The pressure chamber substrate 10, the communication plate 15, the nozzle plate 20, the compliance substrate 45, the diaphragm 50, the piezoelectric element 300, the protective substrate 30, and the case member 40 are laminated members, and the liquid discharge head 510 is formed by laminating the laminated members. In the present disclosure, a direction in which the laminated members forming the liquid discharge head 510 are laminated is also referred to as a "lamination direction". In the present embodiment, the lamination direction coincides with the Z-axis direction.

The pressure chamber substrate 10 is formed by using, for example, a silicon substrate, a glass substrate, an SOI substrate, various ceramic substrates, and the like. As shown in FIG. 4, a plurality of pressure chambers 12 are arranged in the pressure chamber substrate 10 along a predetermined direction in the pressure chamber substrate 10. The direction in which the plurality of pressure chambers 12 are arranged is also referred to as an "arrangement direction". The pressure chamber 12 is formed in a substantially rectangular shape in which a length in the X-axis direction is longer than a length in the Y-axis direction in a plan view. However, the shape of the pressure chamber 12 is not limited to the rectangular shape, and may be a parallelogram shape, a polygonal shape, a circular shape, an oval shape, or the like. The oval shape means a shape in which both end portions in a longitudinal direction are semicircular based on a rectangular shape, and includes a rounded rectangular shape, an elliptical shape, an egg shape, and the like.

In the present embodiment, the plurality of pressure chambers 12 are arranged in two rows each having the Y-axis direction as the arrangement direction. In the example of FIG. 4, the pressure chamber substrate 10 is formed with two pressure chamber rows, that is, a first pressure chamber row L1 having the Y-axis direction as the arrangement direction and a second pressure chamber row L2 having the Y-axis direction as the arrangement direction. The first pressure chamber row L1 and the second pressure chamber row L2 are disposed on both sides while sandwiching the relay substrate 120. Specifically, the second pressure chamber row L2 is disposed on the opposite side of the first pressure chamber row L1 sandwiching the relay substrate 120 in the direction that intersects the arrangement direction of the first pressure chamber row L1. The direction that intersects the arrangement direction is also referred to as an "intersection direction". In the example of FIG. 4, the intersection direction is the X-axis direction, and the second pressure chamber row L2 is disposed in the −X direction with respect to the first pressure chamber row L1 while sandwiching the relay substrate 120. The plurality of pressure chambers 12 do not necessarily have to be arranged in a straight line, and, for example, the plurality of pressure chambers 12 may be arranged along the Y-axis direction according to so-called staggered arrangement to be alternately disposed in the intersection direction.

The plurality of pressure chambers 12 belonging to the first pressure chamber row L1 and the plurality of pressure chambers 12 belonging to the second pressure chamber row L2 have positions which are respectively coincide with each other in the arrangement direction, and are disposed to be adjacent to each other in the intersection direction. In each pressure chamber row, the pressure chambers 12 adjacent to each other in the Y-axis direction are partitioned by a partition wall 11 shown in FIG. 9, as will be described later.

As shown in FIG. 3, the communication plate 15, the nozzle plate 20, and the compliance substrate 45 are laminated on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. As shown in FIG. 5, the communication plate 15 is provided with a nozzle communication path 16, a first manifold portion 17, a second manifold portion 18, and a supply communication path 19. It is preferable that the communication plate 15 is formed by using a material having a thermal expansion coefficient substantially the same as a thermal expansion coefficient of the pressure chamber substrate 10. As a result, when the temperatures of the pressure chamber substrate 10 and the communication plate 15 change, it is possible to suppress the warp of the pressure chamber substrate 10 and the communication plate 15 due to a difference in the thermal expansion coefficient.

As shown in FIG. 5, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as shown in FIG. 5, the second manifold portion 18 is provided on a surface of the communication plate 15 on the +Z direction side without penetrating the communication plate 15 in the Z-axis direction.

As shown in FIG. 5, the supply communication path 19 is a flow path coupled to a pressure chamber supply path 14 provided on the pressure chamber substrate 10. The pressure chamber supply path 14 is a flow path coupled to one end portion of the pressure chamber 12 in the X-axis direction via a throttle portion 13. The throttle portion 13 is a flow path provided between the pressure chamber 12 and the pressure chamber supply path 14. The inner wall of the throttle portion 13 protrudes from the pressure chamber 12 and the pressure chamber supply path 14, and the flow path is formed narrower than the pressure chamber 12 and the pressure chamber supply path 14. As a result, the throttle portion 13 is set so that the flow path resistance is higher than those of the pressure chamber 12 and the pressure chamber supply path 14. Therefore, even when pressure is applied to the pressure chamber 12 by the piezoelectric element 300 when the ink is discharged, it is possible to reduce or prevent the ink in the pressure chamber 12 from flowing back into the pressure chamber supply path 14. A plurality of supply communication paths 19 are arranged along the Y-axis direction, that is, the arrangement direction, and are individually provided for the respective pressure chambers 12. The supply communication path 19 and the pressure chamber supply path 14 communicates the second manifold portion 18 with each pressure chamber 12, and supplies the ink in the manifold 100 to each pressure chamber 12.

The nozzle plate 20 is provided on a side opposite to the pressure chamber substrate 10, that is, on a surface of the communication plate 15 on the +Z direction side while sandwiching the communication plate 15 therebetween. The material of the nozzle plate 20 is not particularly limited, and, for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. However, it is preferable that the nozzle plate 20 uses a material substantially the same as the thermal expansion coefficient of the communication plate 15. As a result, when the temperatures of the nozzle plate 20 and the communication plate 15 change, it is possible to suppress the warp of the nozzle plate 20 and the communication plate 15 due to the difference in the thermal expansion coefficient.

A plurality of nozzles 21 are formed on the nozzle plate 20. Each nozzle 21 communicates with each pressure chamber 12 via the nozzle communication path 16. As shown in FIG. 3, the plurality of nozzles 21 are arranged along the arrangement direction of the pressure chamber 12, that is, the Y-axis direction. The nozzle plate 20 is provided with two nozzle rows in which the plurality of nozzles 21 are arranged in a row. The two nozzle rows are provided to correspond to the first pressure chamber row L1 and the second pressure chamber row L2, respectively.

As shown in FIG. 5, the compliance substrate 45 is provided together with the nozzle plate 20 on the side opposite to the pressure chamber substrate 10 while sandwiching the communication plate 15 therebetween, that is, on a surface of the communication plate 15 on the +Z direction side. The compliance substrate 45 is provided around the nozzle plate 20 and covers openings of the first manifold portion 17 and the second manifold portion 18 provided in the communication plate 15. In the present embodiment, the compliance substrate 45 includes a sealing film 46 made of a flexible thin film and a fixed substrate 47 made of a hard material such as metal. As shown in FIG. 5, a region of the fixed substrate 47, which faces the manifold 100, is an opening portion 48 completely removed in a thickness direction. Therefore, one surface of the manifold 100 is a compliance portion 49 sealed only by the sealing film 46.

As shown in FIG. 5, the diaphragm 50 and the piezoelectric element 300 are laminated on a side opposite to the nozzle plate 20 or the like, that is, on a surface of the pressure chamber substrate 10 on the −Z direction side while sandwiching the pressure chamber substrate 10 therebetween. The piezoelectric element 300 bends and deforms the diaphragm 50 to cause a pressure change in the ink in the pressure chamber 12. In FIG. 5, a configuration of the piezoelectric element 300 is simplified and shown for easy understanding of the technique. The diaphragm 50 is provided on the +Z direction side of the piezoelectric element 300, and the pressure chamber substrate 10 is provided on the +Z direction side of the diaphragm 50.

As shown in FIG. 5, the protective substrate 30 having substantially the same size as the pressure chamber substrate 10 in a plan view is further bonded to the surface of the pressure chamber substrate 10 on the −Z direction side by an adhesive or the like. The protective substrate 30 includes a lid portion 30T, a wall portion 30W, a holding portion 31, and a through hole 32. The holding portion 31 is a space defined by the lid portion 30T and the wall portion 30W, and protects the piezoelectric element 300. The holding portion 31 of the protective substrate 30 is provided for each row of the piezoelectric elements 300 arranged along the arrangement direction, and, in the present embodiment, two holding portions 31 are formed to be arranged adjacent to each other in the X-axis direction. Further, the through hole 32 extends between the two holding portions 31 along the Y-axis direction and penetrates the protective substrate 30 along the Z-axis direction.

As shown in FIG. 5, the case member 40 is fixed on the protective substrate 30. The case member 40 forms the manifold 100 that communicates with the plurality of pressure chambers 12, together with the communication plate 15. The case member 40 has substantially the same outer shape as the communication plate 15 in a plan view, and is bonded to cover the protective substrate 30 and the communication plate 15.

The case member 40 has an accommodation section 41, a supply port 44, a third manifold portion 42, and a coupling port 43. The accommodation section 41 is a space having a depth capable of accommodating the pressure chamber substrate 10 and the protective substrate 30. The third manifold portion 42 is a space formed on both outer sides of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape that is continuous over the Y-axis direction. The supply port 44 communicates with the manifold 100 to supply ink to each manifold 100. The coupling port 43 is a through hole that communicates with the through hole 32 of the protective substrate 30, and the relay substrate 120 is inserted thereto.

In the liquid discharge head 510 of the present embodiment, the ink supplied from the ink tank 550 shown in FIG. 1 is taken from the supply port 44 shown in FIG. 5, and an internal flow path from the manifold 100 to the nozzle 21 is filled with ink. After that, a voltage based on the drive signal is applied to each of the piezoelectric elements 300 corresponding to the plurality of pressure chambers 12. As a result, the diaphragm 50 bends and deforms together with the piezoelectric element 300, the pressure in each pressure chamber 12 increases, and ink droplets are discharged from each nozzle 21.

Figure 6:
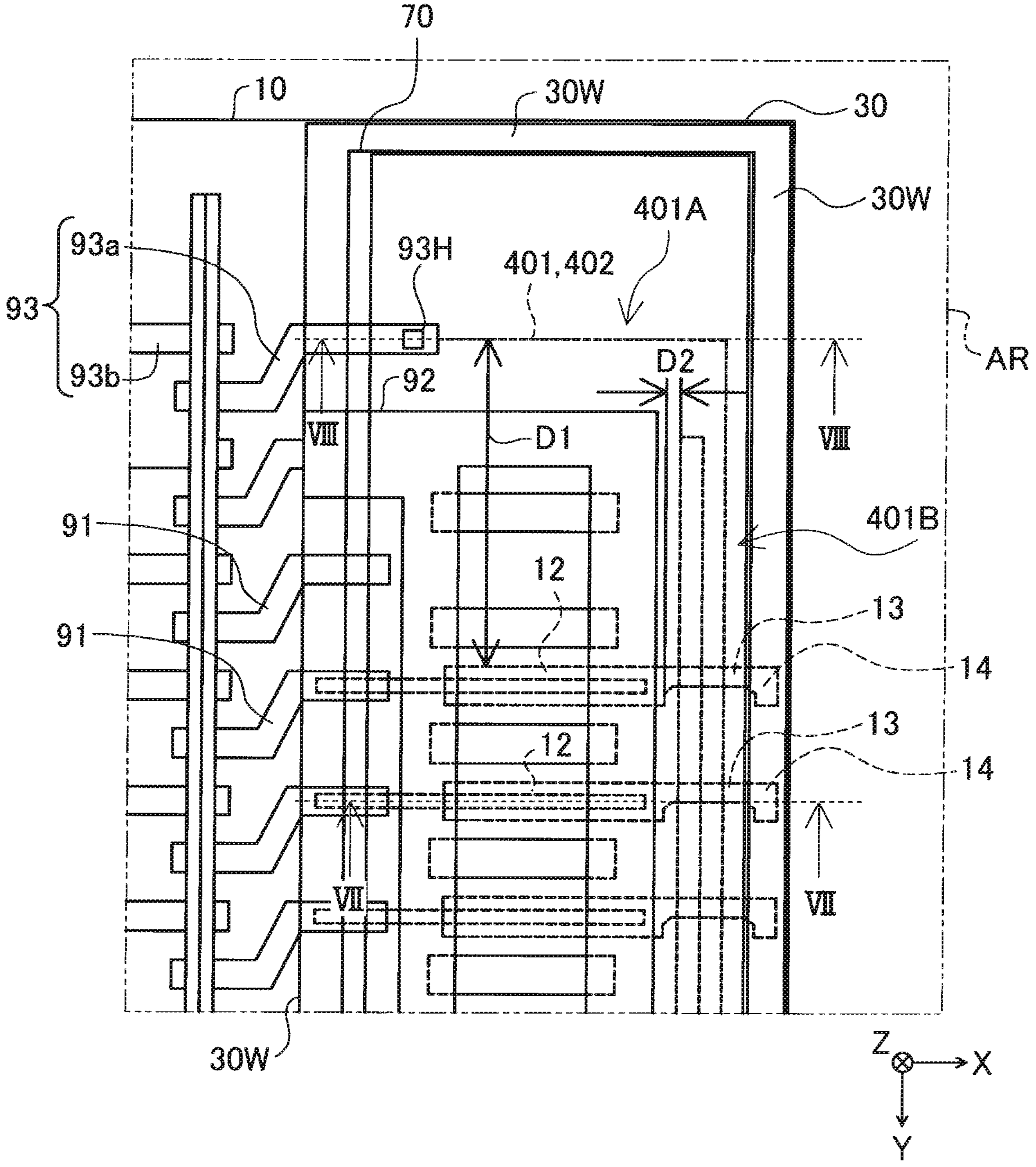
FIG. 6 is an enlarged cross-sectional view showing a part of FIG. 4.
Figure 7:
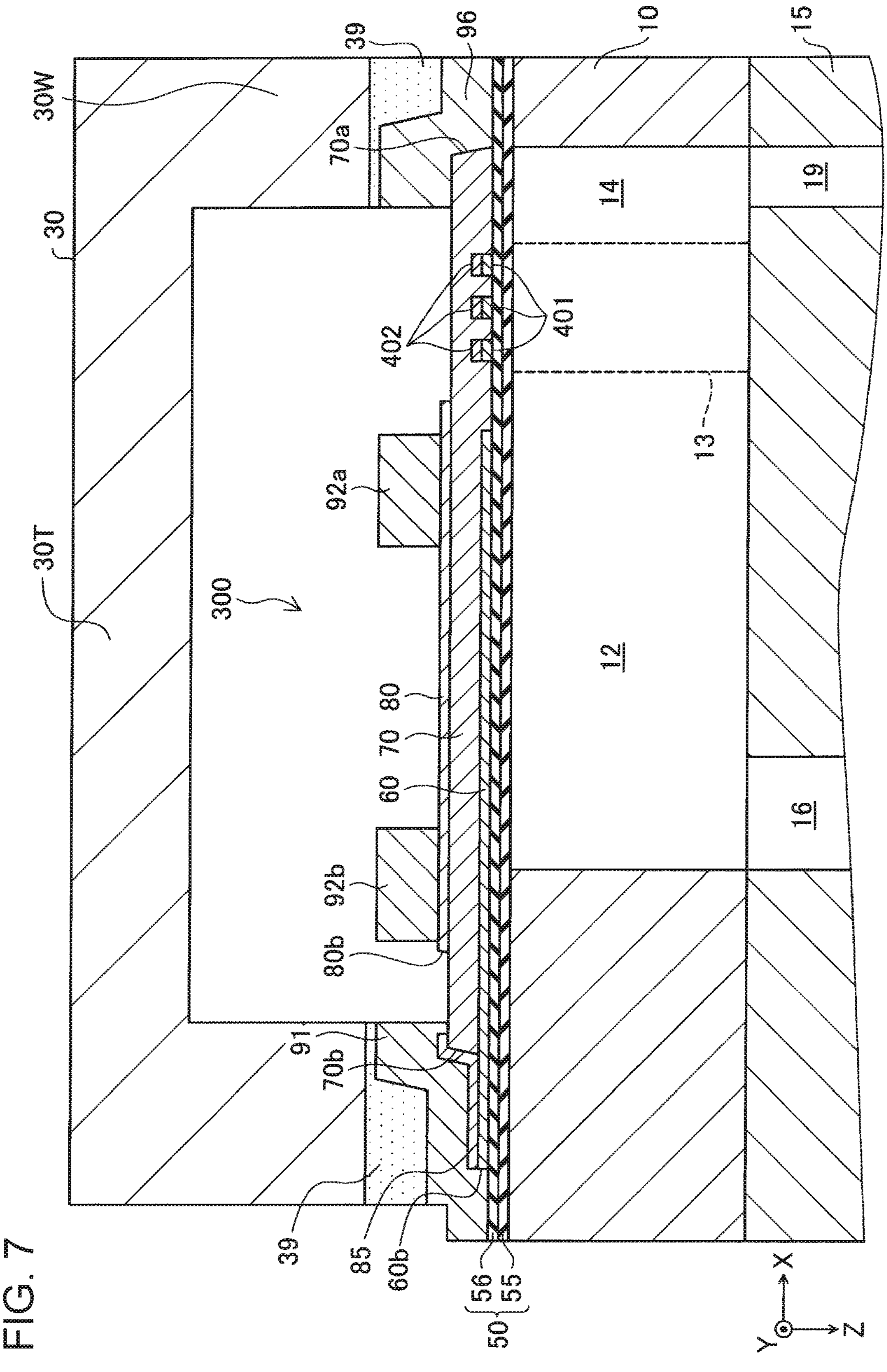
FIG. 7 is a cross-sectional view showing a VII-VII position of FIG. 6.
Figure 8:
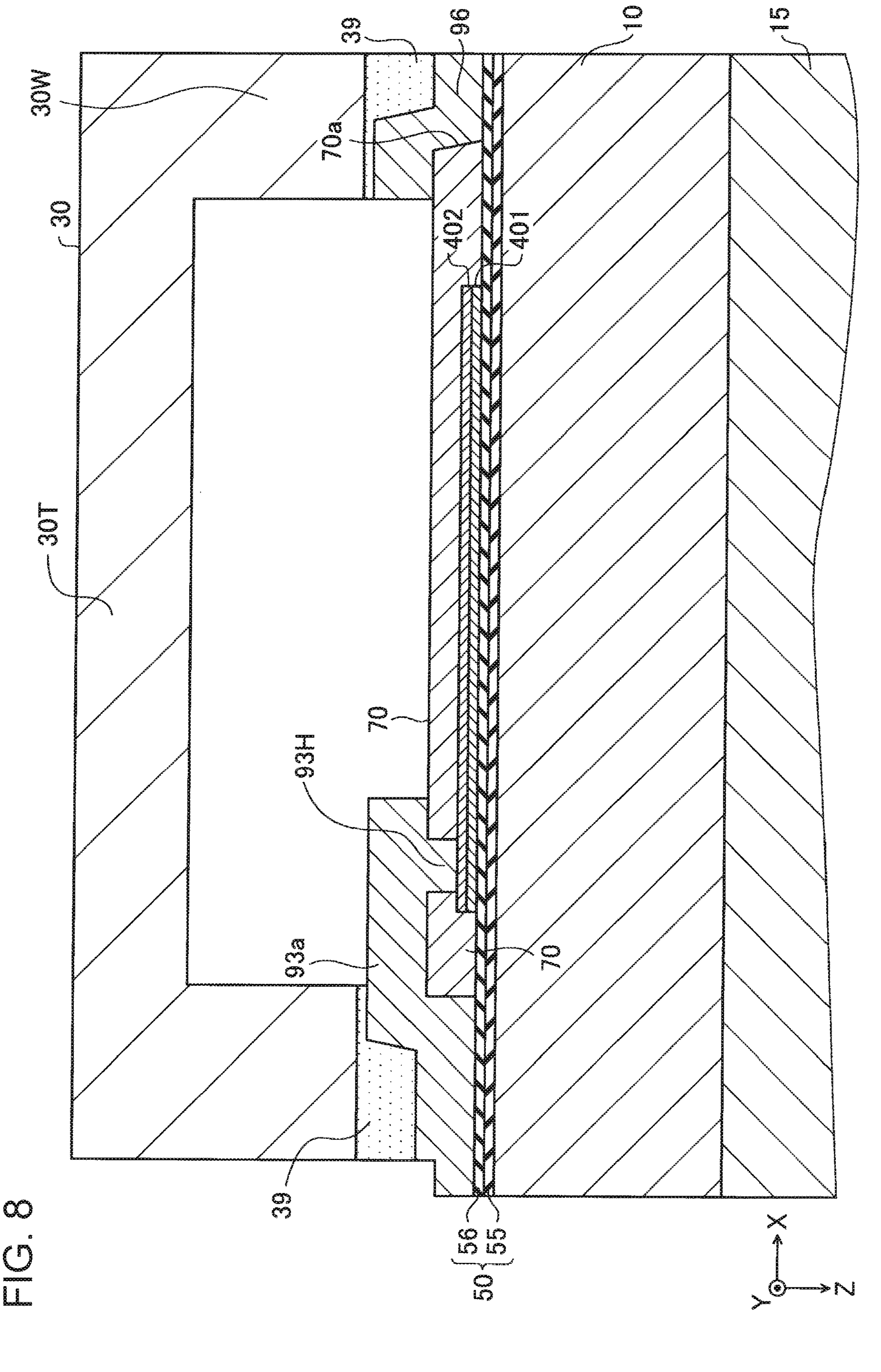
FIG. 8 is a cross-sectional view showing a VIII-VIII position of FIG. 6.

The configurations of the piezoelectric element 300 and the detection resistor 401 will be described with reference to FIGS. 6 to 8 together with FIGS. 4 and 5. FIG. 6 is an enlarged cross-sectional view showing the range AR of FIG. 4. FIG. 7 is a cross-sectional view showing a VII-VII position of FIG. 6. FIG. 8 is a cross-sectional view showing a VIII-VIII position of FIG. 6. As shown in FIG. 6, the liquid discharge head 510 further has an individual lead electrode 91, a common lead electrode 92, a measurement lead electrode 93, and a detection resistor 401, in addition to the diaphragm 50 and the piezoelectric element 300 on the −Z direction side of the pressure chamber substrate 10.

As shown in FIG. 7, the diaphragm 50 has an elastic film 55 provided on the pressure chamber substrate 10 side and formed of silicon oxide ($SiO_2$), and an insulator film 56 provided on the elastic film 55 and formed of a zirconium oxide film ($ZrO_2$). The flow path formed in the pressure chamber substrate 10 such as the pressure chamber 12 is formed by anisotropically etching the pressure chamber substrate 10 from the surface on the +Z direction side. The elastic film 55 constitutes a surface of the flow path, such as the pressure chamber 12, on the −Z direction side. In addition, the diaphragm 50 may be composed of, for example, either the elastic film 55 or the insulator film 56, and may further include another film other than the elastic film 55 and the insulator film 56. Examples of the material of the other film include silicon, silicon nitride, and the like.

The piezoelectric element 300 applies pressure to the pressure chamber 12. As shown in FIG. 7, the piezoelectric element 300 has a first electrode 60, a piezoelectric body 70, and a second electrode 80. As shown in FIG. 7, the first electrode 60, the piezoelectric body 70, and the second electrode 80 are laminated in order from the +Z direction side to the −Z direction side along the lamination direction. The piezoelectric body 70 is provided between the first electrode 60 and the second electrode 80 in the lamination direction in which the first electrode 60, the second electrode 80, and the piezoelectric body 70 are laminated.

Both the first electrode 60 and the second electrode 80 are electrically coupled to the relay substrate 120 shown in FIG. 5. The first electrode 60 and the second electrode 80 apply a voltage corresponding to the drive signal to the piezoelectric body 70. A different drive voltage is supplied to the first electrode 60 according to the discharge amount of ink, and a constant reference voltage signal is supplied to the second electrode 80 regardless of the discharge amount of ink. When the piezoelectric element 300 is driven and a potential difference is generated between the first electrode 60 and the second electrode 80, the piezoelectric body 70 is deformed. Due to the deformation of the piezoelectric body 70, the diaphragm 50 is deformed or vibrated, so that the volume of the pressure chamber 12 changes. Due to the change in the volume of the pressure chamber 12, pressure is applied to the ink accommodated in the pressure chamber 12, and the ink is discharged from the nozzle 21 via the nozzle communication path 16.

The first electrode 60 is an individual electrode that is individually provided for the plurality of pressure chambers 12. As shown in FIG. 7, the first electrode 60 is provided on an opposite side of the second electrode 80 while sandwiching the piezoelectric body 70 therebetween, that is, on the +Z direction side of the piezoelectric body 70, and is provided below the piezoelectric body 70. The thickness of the first electrode 60 is formed to be, for example, approximately 80 nanometers. For example, the first electrode 60 is formed of a conductive material including a metal, such as platinum (Pt), iridium (Ir), gold (Au), titanium (Ti), and a conductive metal oxide such as indium tin oxide abbreviated as ITO. The first electrode 60 may be formed by laminating a plurality of materials such as platinum (Pt), iridium (Ir), gold (Au), and titanium (Ti). In the present embodiment, platinum (Pt) is used as the first electrode 60.

As shown in FIG. 4, the piezoelectric body 70 has a predetermined width in the X-axis direction, and is provided to extend along the arrangement direction of the pressure chambers 12, that is, the Y-axis direction. As shown in FIG. 7, the end portion 70*a* of the piezoelectric body 70 in the +X direction is covered with a wiring portion 96 simultaneously formed with the individual lead electrodes 91. The thickness of the piezoelectric body 70 is formed, for example, from approximately 1000 nanometers to 4000 nanometers. Examples of the piezoelectric body 70 include a crystal film having a perovskite structure formed on the first electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added is used. Specifically, lead titanate (PbTiO3), lead zirconate titanate (Pb(Zr,Ti)O3), lead zirconate (PbZrO3), lead lanthanum titanate ((Pb, La),TiO3), lead lanthanum zirconate titanate ((Pb,La)(Zr,Ti)O3), lead magnesium niobate zirconate (Pb(Zr,Ti)(Mg,Nb)O3), or the like can be used. In the present embodiment, lead zirconate titanate (PZT) is used as the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid ((BiFeO3), abbreviated as "BFO"), barium titanate ((BaTiO3), abbreviated as "BT"), potassium sodium niobate ((K,Na)(NbO3), abbreviated as "KNN"), potassium sodium lithium niobate ((K,Na, Li)(NbO3)), potassium sodium lithium tantalate niobate ((K,Na,Li)(Nb,Ta)O3), bismuth potassium titanate ((Bi1/2K1/2)TiO3, abbreviated as "BKT"), bismuth sodium titanate ((Bi1/2Na1/2)TiO3, abbreviated as "BNT"), bismuth manganate (BimnO3, abbreviated as "BM"), composite oxide containing bismuth, potassium, titanium and iron and having a perovskite structure (x[(BixK1-x)TiO3]-(1-x)[BiFeO3], abbreviated as "BKT-BF"), composite oxide containing bismuth, iron, barium and titanium and having a perovskite structure ((1-x)[BiFeO3]-x[BaTiO3], abbreviated as "BFO-BT"), and a material ((1-x)[Bi(Fe1-yMy)O3]-x[BaTiO3] (M is Mn, Co or Cr)), which is obtained by adding metals, such as manganese, cobalt, and chromium, to the composite oxide.

As shown in FIG. 4, the second electrode 80 is a common electrode that is commonly provided with respect to the plurality of pressure chambers 12. The second electrode 80 has a predetermined width in the X-axis direction, and is provided to extend along the arrangement direction of the pressure chambers 12, that is, the Y-axis direction. As shown in FIG. 7, the second electrode 80 is provided above the piezoelectric body 70 on an opposite side of the first electrode 60 while sandwiching the piezoelectric body 70 therebetween, that is, on the −Z direction side of the piezoelectric body 70. The material of the second electrode 80 is not particularly limited, but, similar to the first electrode 60, for example, metals, such as platinum (Pt), iridium (Ir), gold (Au), and titanium (Ti), and conductive materials including conductive metal oxides, such as indium tin oxide abbreviated as ITO, are used. Alternatively, a plurality of materials such as platinum (Pt), iridium (Ir), gold (Au), and titanium (Ti) may be laminated and formed. In the present embodiment, iridium (Ir) is used as the second electrode 80.

A wiring portion 85 is provided on the further-X direction side of the end portion 80*b* of the second electrode 80 in the −X direction. The wiring portion 85 is in the same layer as the second electrode 80, but is electrically discontinuous with the second electrode 80. The wiring portion 85 is formed from the end portion 70*b* of the piezoelectric body 70 in the −X direction to the end portion 60*b* of the first electrode 60 in the −X direction in a state of being spaced from the end portion 80*b* of the second electrode 80. The wiring portion 85 is provided for each piezoelectric element 300, and a plurality of wiring portions 85 are disposed at predetermined intervals along the Y-axis direction. It is preferable that the wiring portion 85 is formed in the same layer as the second electrode 80. As a result, the cost can be reduced by simplifying a manufacturing process of the wiring portion 85. However, the wiring portion 85 may be formed in a layer different from the layer of the second electrode 80.

As shown in FIGS. 6 and 7, the individual lead electrode 91 is electrically coupled to the first electrode 60 which is an individual electrode, and an extension portion 92*a* and an extension portion 92*b* of the common lead electrode 92 is electrically coupled to the second electrode 80 which is a common electrode. The individual lead electrode 91 and the common lead electrode 92 function as drive wirings for applying a voltage for driving the piezoelectric body 70 to the piezoelectric body 70. In the present embodiment, a power supply circuit for supplying electric power to the piezoelectric body 70 via the drive wiring and the current application circuit 430 for supplying electric power to the detection resistor 401 are different circuits from each other.

The materials of the individual lead electrode 91 and the common lead electrode 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used as the individual lead electrode 91 and the common lead electrode 92. Further, the individual lead electrode 91 and the common lead electrode 92 may have an adhesion layer for improving the adhesion with the first electrode 60, the second electrode 80, and the diaphragm 50.

The individual lead electrode 91 and the common lead electrode 92 are formed in the same layer so as to be electrically discontinuous. As a result, as compared with when the individual lead electrode 91 and the common lead electrode 92 are individually formed, the cost can be reduced by simplifying the manufacturing process. The individual lead electrode 91 and the common lead electrode 92 may be formed in different layers.

As shown in FIG. 6, the individual lead electrode 91 is provided for each first electrode 60. As shown in FIG. 7, the individual lead electrode 91 is coupled to the vicinity of the end portion 60*b* of the first electrode 60 via the wiring portion 85, and is pulled out in the −X direction to a top of the diaphragm 50.

As shown in FIG. 4, the common lead electrode 92 extends along the Y-axis direction, bends at both ends in the Y-axis direction, and is pulled out in the −X direction. The common lead electrode 92 has an extension portion 92*a* extending along the Y-axis direction and an extension portion 92*b*. As shown in FIGS. 4 and 5, the individual lead electrode 91 and the common lead electrode 92 are extended to be exposed in the through hole 32 formed in the protective substrate 30, and are electrically coupled to the relay substrate 120 in the through hole 32.

The relay substrate 120 is composed of, for example, a Flexible Printed Circuit (FPC). The relay substrate 120 is formed with a plurality of wirings for being coupled to the control section 580 and a power supply circuit (not shown). In addition, the relay substrate 120 may be composed of any flexible substrate, such as Flexible Flat Cable (FFC), instead of FPC. An integrated circuit 121 having a switching element is mounted at the relay substrate 120. A signal for driving the piezoelectric element 300 is input to the integrated circuit 121. The integrated circuit 121 controls a timing at which the signal for driving the piezoelectric element 300 is supplied to the first electrode 60 based on the input signal. As a result, the timing at which the piezoelectric element 300 is driven and the drive amount of the piezoelectric element 300 are controlled.

As shown in FIG. 4, the detection resistor 401 is further provided on the surface of the diaphragm 50 on the −Z direction side. As shown in FIG. 4, in the present embodiment, the detection resistor 401 is continuously formed so as to surround the periphery of the first pressure chamber row L1 and the second pressure chamber row L2 in a plan view. In the example of FIG. 4, the detection resistor 401 may be formed as a so-called meandering pattern to be reciprocated a plurality of times in the vicinity of the first pressure chamber row L1 and the second pressure chamber row L2. With the configuration, it is possible to improve the temperature detection accuracy of the ink in the pressure chamber 12 by the detection resistor 401. However, the detection resistor 401 is not limited to the meandering pattern, and may be formed, for example, in any shape such as a linear shape.

As shown in FIG. 7, the detection resistor 401 is disposed so as to pass in the vicinity of the ink flow path in the pressure chamber substrate 10 in a cross-sectional view. In the present embodiment, the detection resistor 401 is disposed so as to pass through the throttle portion 13 of each pressure chamber 12 on the −Z direction side sandwiching the diaphragm 50. As a result, the temperature of the ink in the pressure chamber 12 can be detected accurately as compared with when the detection resistor 401 is disposed at a position separated from the pressure chamber 12.

The material of the detection resistor 401 is a material whose electric resistance value is temperature dependent. For example, gold (Au), platinum (Pt), iridium (Ir), aluminum (Al), copper (Cu), titanium (Ti), tungsten (W), nickel (Ni), chromium (Cr), and the like can be used. Here, platinum (Pt) can be preferably used as a material for the detection resistor 401 from a viewpoint that the change in electric resistance with temperature is large and stability and accuracy are high.

As shown in FIG. 7, in the present embodiment, the detection resistor 401 is in the same layer as the first electrode 60 in the lamination direction, and is formed to be electrically discontinuous with the first electrode 60. The detection resistor 401 is formed together with the first electrode 60 in a step of forming the first electrode 60. The material of the detection resistor 401 is platinum (Pt), which is the same as that of the first electrode 60, and the thickness of the detection resistor 401 is approximately 80 nanometers, which is the same as that of the first electrode 60. However, the present disclosure is not limited thereto, and the detection resistor 401 may be individually formed separately from the first electrode 60, or may be formed in a different layer from the first electrode 60.

As shown in FIG. 7, in the present embodiment, the detection resistor 401 is laminated above a layer having an insulating property. The detection resistor 401 is formed on the diaphragm 50, and an insulator film 56 having an insulating property is provided to be in contact with the surface facing the pressure chamber in the detection resistor 401. An insulating layer provided on the surface facing the pressure chamber in the detection resistor 401 is also referred to as a “second layer”. In present embodiment, the second layer is formed of ZrO2. The second layer does not necessarily have to be in contact with the detection resistor 401. For example, between the detection resistor 401 and the low thermal conductive layer 402, for example, an adhesion layer, such as Ti, for improving the adhesion with the detection resistor 401 and the insulating layer may be disposed. Further, the second layer may be omitted.

FIG. 6 shows a measurement lead electrode 93 including a measurement lead electrode 93*a* and a measurement lead electrode 93*b*. The measurement lead electrode 93 functions as a coupling portion for electrically coupling the detection resistor 401 and the relay substrate 120. One end of the detection resistor 401 is electrically coupled to the measurement lead electrode 93*a* via a contact hole 93H. Although not shown, similarly, the other end of the detection resistor 401 is also coupled to the measurement lead electrode 93*b* via the contact hole 93H. As a result, the temperature calculation section 450 can detect the electric resistance value of the detection resistor 401. In addition, the measurement lead electrode 93 and the detection resistor 401 are not limited to the coupling by the contact hole 93H, and, for example, may be electrically coupled to each other by a method without using the contact hole 93H such as a method of laminating the measurement lead electrode 93 on the detection resistor 401.

In the present embodiment, the measurement lead electrode 93 is formed in the same layer as the individual lead electrode 91 and the common lead electrode 92, and is formed to be electrically discontinuous. The material of the measurement lead electrode 93 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) is used as the measurement lead electrode 93. The material of the measurement lead electrode 93 is the same as the materials of the individual lead electrode 91 and the common lead electrode 92.

As shown in FIG. 7, in the present embodiment, a low thermal conductive layer 402 is laminated on the detection resistor 401. Specifically, the low thermal conductive layer 402 is provided on a surface opposite to the surface facing the pressure chamber substrate 10, that is, a surface on the −Z direction side in the detection resistor 401. The low thermal conductive layer 402 is a layer having a lower thermal conductivity than the detection resistor 401. The low thermal conductive layer 402 is also referred to as a "first layer".

The low thermal conductive layer 402 is laminated only on the detection resistor 401, and is covered with the piezoelectric body 70 together with the detection resistor 401. By providing a layer having a low thermal conductivity on the surface opposite to the surface facing the pressure chamber substrate 10 in the detection resistor 401, it is possible to suppress the heat transferred from the ink in the pressure chamber 12 to the detection resistor 401 from being dissipated from the surface opposite to the surface facing the pressure chamber substrate 10. It is preferable that, for example, the low thermal conductive layer 402 is equal to or larger than 15 nanometers. It is preferable that the thickness of the low thermal conductive layer 402 is as thick as possible in order to more reliably suppress heat dissipation from the detection resistor 401. The low thermal conductive layer 402 does not necessarily have to be in contact with the detection resistor 401. For example, between the detection resistor 401 and the low thermal conductive layer 402, for example, an adhesion layer, such as iridium (Ir), for improving the adhesion with the detection resistor 401 and the low thermal conductive layer 402 may be disposed.

As shown in FIG. 8, the low thermal conductive layer 402 is laminated above the detection resistor 401. From the viewpoint of facilitating the electrical coupling between the measurement lead electrode 93 and the detection resistor 401 via the contact hole 93H, it is preferable that the low thermal conductive layer 402 is formed of, for example, a conductive material such as metal.

Figure 9:
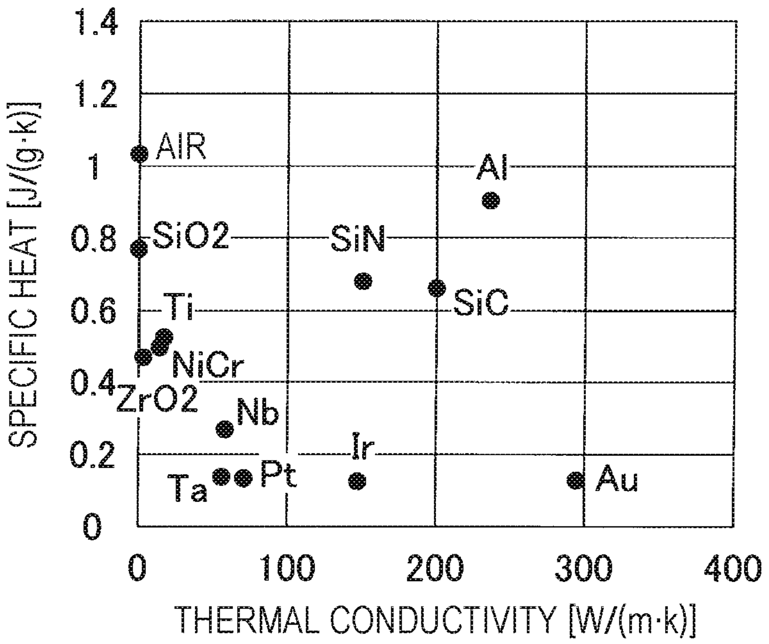
FIG. 9 is an explanatory view showing an example of a material that can be applied to a low thermal conductive layer.

Details of the configuration and function of the low thermal conductive layer 402 will be described with reference to FIGS. 9 and 10. FIG. 9 is an explanatory view showing an example of a material that can be applied to the low thermal conductive layer 402. FIG. 9 shows a graph in which a horizontal axis is a thermal conductivity [W/(m·K)] and a vertical axis is a specific heat [J/(g·K)], and shows a result obtained by plotting each material using known physical property values. As shown in FIG. 9, in the thermal conductivity [W/(m·K)] of each material, for example, Ti is 17, Ni and Cr are 13.4, Ta is 56, and Nb is 58, Pt is 70, Ir is 147, Al is 236, and Au is 295. Further, the air is 0.03, SiO2 is 1.38, ZrO2 is 3, SiC is 200, and SiN is 150. In the specific heat [J/(g·K)] of each material, for example, Ti is 0.52, Ni and Cr are 0.5, Ta is 0.14, Nb is 0.27, Pt is 0.13, Ir is 0.13, Al is 0.9, and Au is 0.13. Further, the air is 1.03, SiO2 is 0.77, ZrO2 is 0.47, SiC is 0.66, and SiN is 0.68.

From the viewpoint of suppressing heat dissipation from the detection resistor 401, it is preferable to use a material having a low thermal conductivity for the low thermal conductive layer 402. For example, in temperature detection using the detection resistor 401, it is experimentally confirmed that the low thermal conductive layer 402 can obtain high measurement accuracy when the thermal conductivity is equal to or less than 130 [W/(m·K)]. From this, it is preferable that the low thermal conductive layer 402 is formed of any of SiO2, ZrO2, Ti, Ni, Cr, Ta, Nb, and Pt.

In the present embodiment, the thermal conductivity of Pt used as the detection resistor 401 is 70. From the viewpoint of suppressing heat dissipation from the detection resistor 401, it is preferable that the thermal conductivity of the low thermal conductive layer 402 is lower than at least the thermal conductivity of the detection resistor 401. Further, from the viewpoint of suppressing heat transfer from the low thermal conductive layer 402 to the detection resistor 401, it is more preferable that the low thermal conductive layer 402 is formed of a material having a high specific heat. Further, it is more preferable to be formed of a material having a higher specific heat than that of the detection resistor 401. From the above, it is preferable that the low thermal conductive layer 402 is formed of any of Ti, Ni, Cr, Ta, and Nb. In the present embodiment, the low thermal conductive layer 402 is formed of Ti. By forming Ti layer above the detection resistor 401, the low thermal conductive layer 402 can further function as a seed layer or an orientation control layer with respect to the piezoelectric body 70 above the low thermal conductive layer 402.

Figure 10:
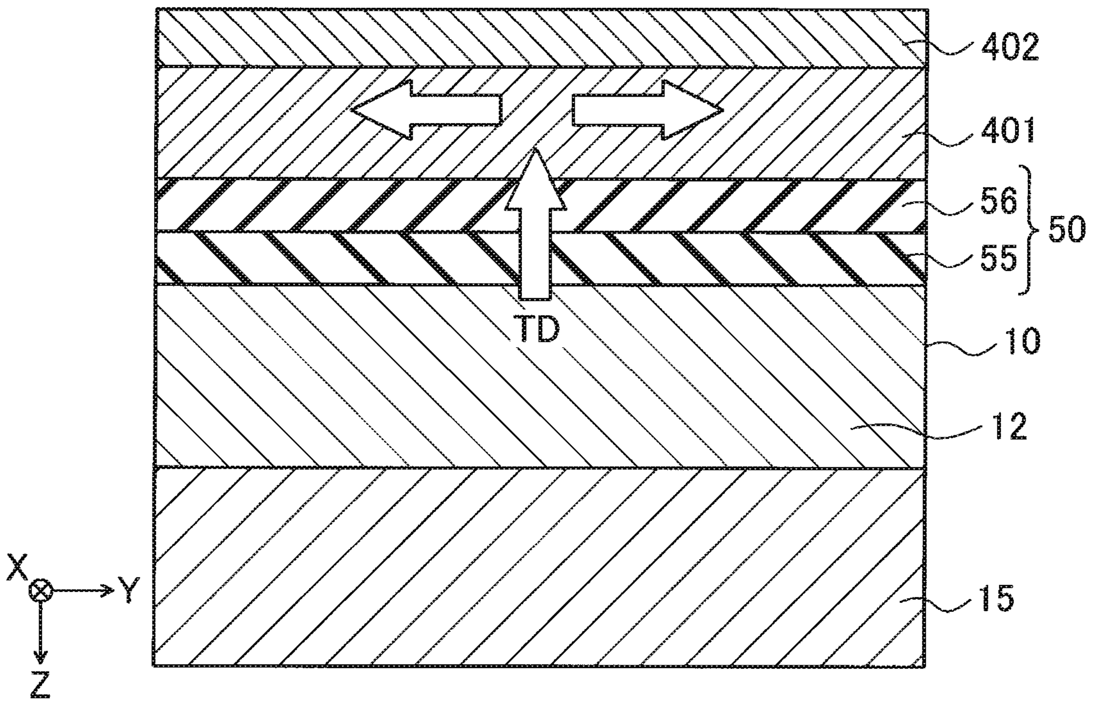
FIG. 10 is an explanatory view showing a cross-sectional structure in the vicinity of a detection resistor and a low thermal conductive layer.

FIG. 10 is an explanatory view showing a cross-sectional structure in the vicinity of the detection resistor 401 and the low thermal conductive layer 402. FIG. 10 schematically shows the positional relationship of each layer in the lamination direction from the communication plate 15 to the low thermal conductive layer 402. In addition, FIG. 10 and FIGS. 11 and 12, which will be described later, are conceptual views and do not accurately show the thickness of each portion.

Arrow TD shown in FIG. 10 conceptually shows a movement route of heat dissipated from the ink in the pressure chamber 12. As shown by arrow TD, the heat of the ink in the pressure chamber 12 is transferred to the detection resistor 401 via the diaphragm 50. The heat transferred to the detection resistor 401 is difficult to be transferred to the low thermal conductive layer 402 having the low thermal conductivity and is easy to be transferred to the inside of the detection resistor 401, so that it is possible to improve the temperature detection accuracy by the detection resistor 401.

As described above, the liquid discharge head 510 of the present embodiment includes the pressure chamber substrate 10 that is provided with the plurality of pressure chambers 12, the first electrode 60 as the individual electrode that is individually provided for the plurality of pressure chambers 12, the second electrode 80 as the common electrode that is commonly provided for the plurality of pressure chambers 12, the piezoelectric body 70 that is provided between the first electrode 60 and the second electrode 80 for applying the pressure to the ink in the pressure chamber 12, the individual lead electrode 91 and the common lead electrode 92 as the drive wirings that are electrically coupled to the first electrode 60 and the second electrode 80 and apply the voltage for driving the piezoelectric body 70, the detection resistor 401 that is formed of the same material as any of the first electrode 60, the second electrode 80, the individual lead electrode 91, and the common lead electrode 92 for detecting the temperature of the liquid in the pressure chamber 12, and the low thermal conductive layer 402 as a first layer that is provided on the surface opposite to the surface facing the pressure chamber substrate 10 in the detection resistor 401, and has the lower thermal conductivity than the detection resistor 401. By providing the low thermal conductive layer 402 on the surface opposite to the surface facing the pressure chamber substrate 10 in the detection resistor 401, the heat transferred from the ink in the pressure chamber 12 to the detection resistor 401 can be reduced or prevented from being dissipated from the detection resistor 401.

According to the liquid discharge head 510 of the present embodiment, the detection resistor 401 is formed of the same material as the first electrode 60. Therefore, the detection resistor 401 can be formed together with the first electrode 60 in a process of forming the first electrode 60. As a result, as compared with when the detection resistor 401 is formed separately from the first electrode 60, the productivity can be improved by simplifying the manufacturing process.

According to the liquid discharge head 510 of the present embodiment, the detection resistor 401 is formed of Pt. By applying a material having a large change in electric resistance due to temperature and high stability and accuracy to the detection resistor 401, the temperature detection accuracy by the detection resistor 401 can be improved.

According to the liquid discharge head 510 of the present embodiment, the low thermal conductive layer 402 as the first layer has a higher specific heat than the detection resistor 401. Therefore, the heat transfer from the low thermal conductive layer 402 to the detection resistor 401 can be reduced or suppressed, so that the temperature detection accuracy by the detection resistor 401 can be improved.

According to the liquid discharge head 510 of the present embodiment, the low thermal conductive layer 402 as the first layer is formed of metal. For example, an electrode located above the detection resistor 401, such as the measurement lead electrode 93, and the detection resistor 401 can be electrically coupled via the low thermal conductive layer 402. Therefore, it is possible to facilitate the electrical coupling between the relay substrate 120 and the detection resistor 401 while including the low thermal conductive layer 402.

According to the liquid discharge head 510 of the present embodiment, the low thermal conductive layer 402 is formed of any of Ti, Ni, Cr, Ta, and Nb. By using a metal material having a lower thermal conductivity and a higher specific heat than Pt or the like used for the detection resistor 401, it is possible to form the low thermal conductive layer 402 suitable for temperature detection by the detection resistor 401.

According to the liquid discharge head 510 of the present embodiment, the thermal conductivity of the low thermal conductive layer 402 is equal to or less than 130 [W/(m·K)]. Therefore, it is possible to form the low thermal conductive layer 402 suitable for the temperature detection by the detection resistor 401.

The liquid discharge head 510 of the present embodiment includes the insulator film 56 as the second layer that is provided on the surface facing the pressure chamber substrate 10 in the detection resistor 401 and has an insulating property. By forming the detection resistor 401 on the second layer which is the insulating layer, the detection accuracy of the electric resistance value of the detection resistor 401 by the temperature acquisition section 400 can be improved, and the temperature detection accuracy can be improved.

According to the liquid discharge head 510 of the present embodiment, the second layer is formed of ZrO2. By forming the detection resistor 401 on the insulator film 56, the detection accuracy of the electric resistance value of the detection resistor 401 by the temperature acquisition section 400 can be improved, and the temperature detection accuracy can be improved.

B. Second Embodiment

Figure 11:
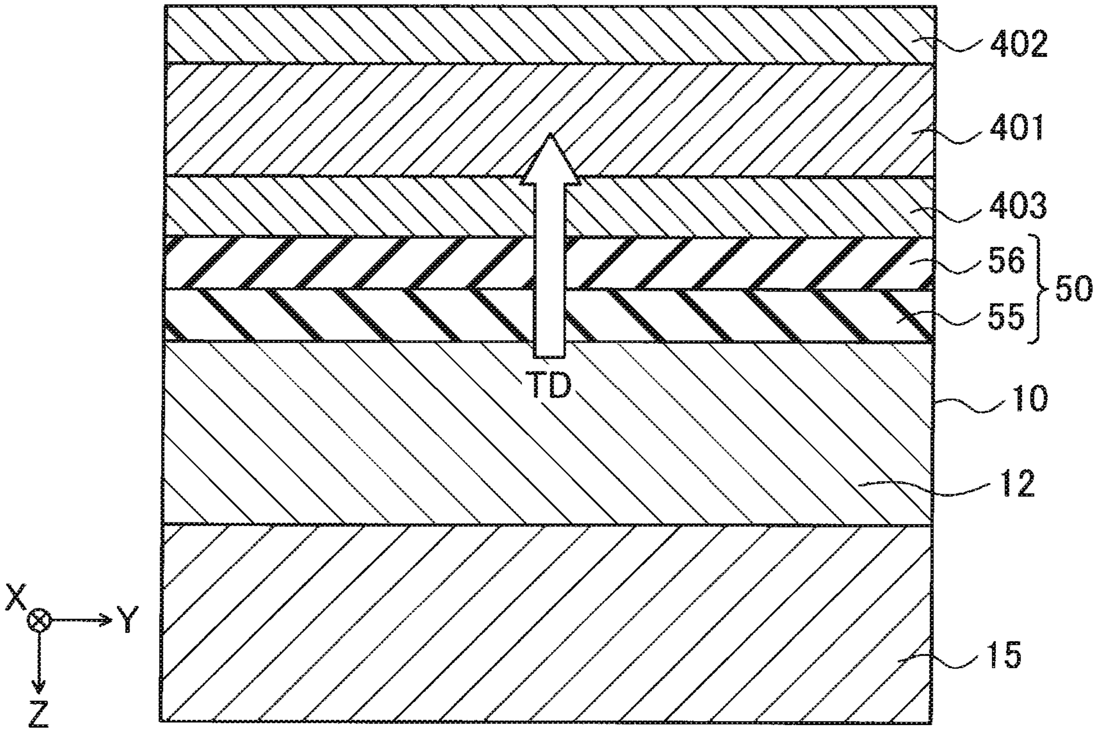
FIG. 11 is a cross-sectional view showing a structure in the vicinity of the detection resistor of a liquid discharge head as a second embodiment of the present disclosure.

FIG. 11 is a cross-sectional view showing a structure in the vicinity of the detection resistor 401 of a liquid discharge head 510 as a second embodiment of the present disclosure. The liquid discharge head 510 of the second embodiment is different from the liquid discharge head 510 of the first embodiment in a fact that the detection resistor 401 is laminated above a high thermal conductive layer 403 having a higher thermal conductivity than the detection resistor 401, and the other configurations are the same as in the liquid discharge head 510 of the first embodiment.

As shown in FIG. 11, the detection resistor 401 is provided with a high thermal conductive layer 403 in contact with the surface of the detection resistor 401, which faces the pressure chamber substrate 10. In other words, the high thermal conductive layer 403 is disposed between the detection resistor 401 and the insulator film 56 as the second layer. A layer, which is provided between the detection resistor 401 and the second layer and has a higher thermal conductivity than the detection resistor 401, is also referred to as a "third layer".

From the viewpoint of smoothly transferring the heat of the ink in the pressure chamber 12 to the detection resistor 401, it is preferable that the thermal conductivity of the third layer is at least higher than the thermal conductivity of the detection resistor 401. Therefore, as shown in FIG. 9, for example, it is preferable that the high thermal conductive layer 403 is formed of any of Ir, Al, and Au. Further, it is preferable that the high thermal conductive layer 403 is formed of a material having a lower specific heat than the detection resistor 401. Therefore, it is more preferable that the high thermal conductive layer 403 is formed of Ir or Au. It is preferable that the third layer has a property other than high thermal conductivity. In the present embodiment, the high thermal conductive layer 403 is formed of Au from the viewpoint of further improving the adhesion with the insulator film 56 and the detection resistor 401.

It is preferable that the thickness of the high thermal conductive layer 403 is as thin as possible from the viewpoint of smoothly transferring the heat of the ink in the pressure chamber 12 to the detection resistor 401. It is preferable that the thickness of the high thermal conductive layer 403 is thinner than at least the thickness of the detection resistor 401, and it is more preferable that the thickness of the high thermal conductive layer 403 is thinner than the low thermal conductive layer 402. It is preferable that, for example, the high thermal conductive layer 403 is less than 15 nanometers. The high thermal conductive layer 403 does not necessarily have to be in contact with the detection resistor 401, and, for example, an adhesion layer formed of, for example, Ti may be provided between the detection resistor 401 and the high thermal conductive layer 403.

According to the liquid discharge head 510 of the present embodiment, the high thermal conductive layer 403 as the third layer having a higher thermal conductivity than the detection resistor 401 is provided between the detection resistor 401 and the insulator film 56 which is the second layer. Therefore, the heat of the ink in the pressure chamber 12 can be smoothly transferred to the detection resistor 401 via the third layer.

According to the liquid discharge head 510 of the present embodiment, the high thermal conductive layer 403 is formed of Au. Therefore, the adhesion with the insulator film 56 as the second layer and the detection resistor 401 can be further improved.

According to the liquid discharge head 510 of the present embodiment, the thickness of the high thermal conductive layer 403 is thinner than the thickness of the low thermal conductive layer 402. Therefore, the heat of the ink in the pressure chamber 12 can be smoothly transferred to the detection resistor 401 via the third layer while suppressing heat dissipation from the detection resistor 401.

According to the liquid discharge head 510 of the present embodiment, the thickness of the low thermal conductive layer 402 is equal to or larger than 15 nanometers. Therefore, it is possible to suppress heat dissipation from the detection resistor 401 while smoothly transferring the heat of the ink in the pressure chamber 12 to the detection resistor 401 via the third layer.

C. Third Embodiment

Figure 12:
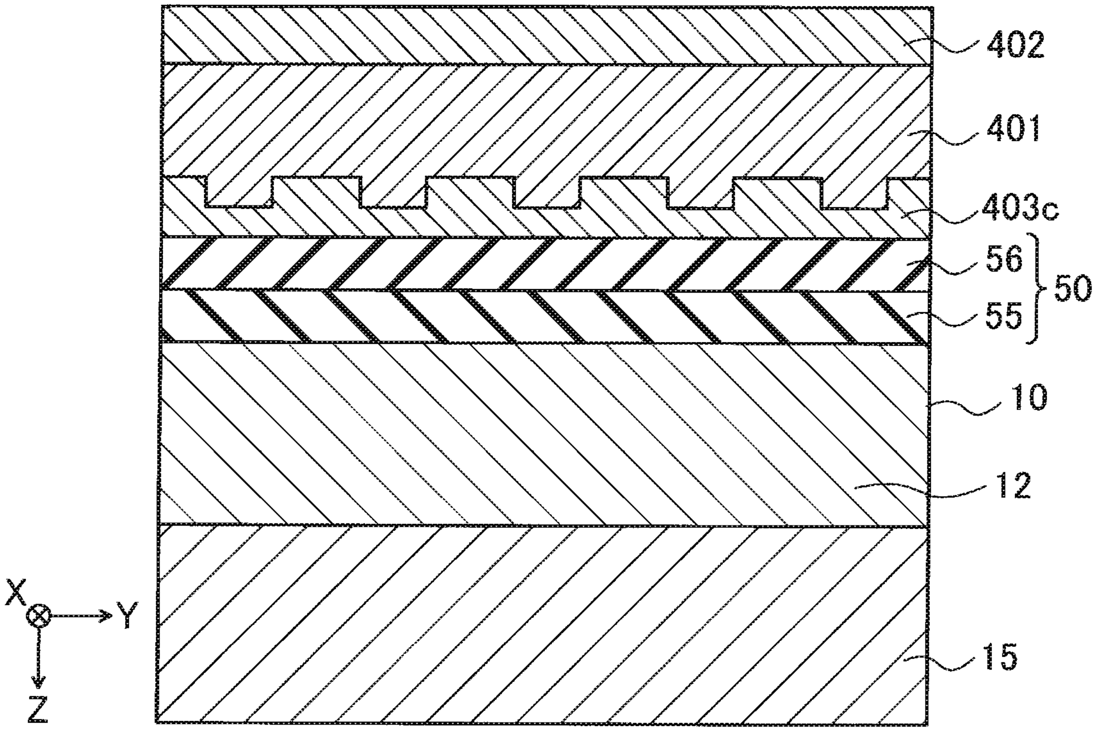
FIG. 12 is a cross-sectional view showing a structure in the vicinity of a detection resistor of a liquid discharge head as a third embodiment of the present disclosure.

FIG. 12 is a cross-sectional view showing a structure in the vicinity of the detection resistor 401 of the liquid discharge head 510 as a third embodiment of the present disclosure. The liquid discharge head 510 of the third embodiment is different from the liquid discharge head 510 of the first embodiment in a fact that a high thermal conductive layer 403*c* is provided as the third layer, and the other configurations are the same as in the liquid discharge head 510 of the first embodiment. The high thermal conductive layer 403*c* is different from the high thermal conductive layer 403 shown in the second embodiment in a fact that the cross-sectional shape is different, and the other configurations are the same as the configuration of the high thermal conductive layer 403 of the second embodiment.

As shown in FIG. 12, the high thermal conductive layer 403*c* has an uneven shape on the surface facing the detection resistor 401. The depth from the surface to the bottom surface of the uneven shape can be, for example, approximately 1 nanometer to 2 nanometers. The uneven shape can be formed by, for example, performing dry etching such as ion milling on the high thermal conductive layer 403*c*.

By causing the high thermal conductive layer 403*c* and the detection resistor 401 to be in contact with each other via an uneven surface, the contact space between the high thermal conductive layer 403*c* and the detection resistor 401 is increased, as compared with when the high thermal conductive layer 403*c* does not have the uneven shape, so that the heat transfer from the high thermal conductive layer 403*c* to the detection resistor 401 can be made smoother. Further, the adhesion between the detection resistor 401 and the insulator film 56 can be further improved.

Figure 13:
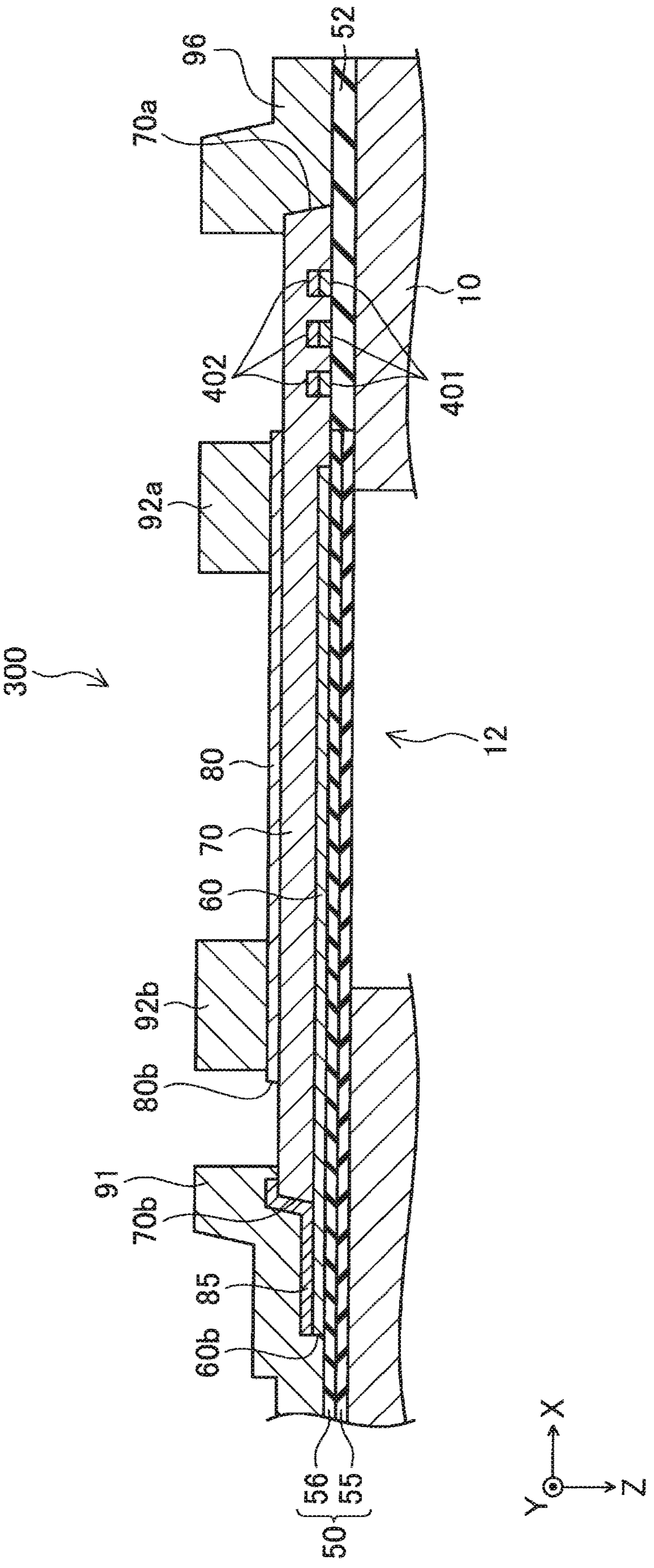
FIG. 13 is a cross-sectional view showing a structure in the vicinity of a detection resistor of a liquid discharge head as another embodiment of the present disclosure.

D. Other Embodiments (D1) In the first embodiment, an example is shown in which the detection resistor 401 is formed on the insulator film 56 as the second layer. On the other hand, an insulating layer other than the insulator film 56 may be provided as the second layer on the surface facing the pressure chamber substrate 10 in the detection resistor 401. FIG. 13 is a cross-sectional view showing a structure in the vicinity of the detection resistor 401 of a liquid discharge head 510 as another embodiment of the present disclosure. As shown in FIG. 13, the detection resistor 401 may be formed on an insulating layer 52 different from the insulator film 56 and the elastic film 55. The insulating layer 52 can be formed of, for example, silicon, silicon nitride, or the like. In addition, as shown in FIG. 13, the detection resistor 401 may be provided so as to face a part other than the ink flow path, such as the pressure chamber 12, in the pressure chamber substrate 10.

(D2) In each of the above embodiments, the material of the detection resistor 401 is platinum (Pt) and is formed of the same material as the first electrode 60. On the other hand, the detection resistor 401 may be formed of the same material as any of the common electrode and the drive wiring while being not limited to the individual electrode. For example, the detection resistor 401 may be formed of the same material as the second electrode 80 which is the common electrode. According to the liquid discharge head 510 of the aspect, for example, the detection resistor 401 can be formed in a process of forming the second electrode 80, so that the cost can be reduced by simplifying the manufacturing process. Further, the detection resistor 401 may be formed of the same material as the individual lead electrode 91 and the common lead electrode 92 which are drive wirings. According to the liquid discharge head 510 of the aspect, for example, the detection resistor 401 can be formed in a process of forming the individual lead electrode 91 and the common lead electrode 92, so that the cost can be reduced by simplifying the manufacturing process.

(D3) In each of the above embodiments, the second electrode 80 as the common electrode is provided above the piezoelectric body 70, and the first electrode 60 as the individual electrode is provided below the piezoelectric body 70. On the other hand, the second electrode as the common electrode may be provided below the piezoelectric body 70, and the first electrode 60 as the individual electrode may be provided above the piezoelectric body 70.

E. Other Aspects

The present disclosure is not limited to the above-described embodiments, and can be realized in various configurations without departing from the gist of the present disclosure. For example, technical features in the embodiments corresponding to technical features in respective aspects described in outline of the present disclosure can be appropriately replaced or combined in order to solve some or all of the above-described problems or achieve some or all of the above-described effects. Further, when the technical features are not described as essential in the present specification, the technical features can be appropriately deleted.

(1) According to one aspect of the present disclosure, there is provided a liquid discharge head. The liquid discharge head includes a pressure chamber substrate that is provided with a plurality of pressure chambers, an individual electrode that is individually provided for the plurality of pressure chambers, a common electrode that is commonly provided for the plurality of pressure chambers, a piezoelectric body that is provided between the individual electrode and the common electrode for applying pressure to liquid in the pressure chambers, a drive wiring that is electrically coupled to the individual electrode and the common electrode, and applies a voltage for driving the piezoelectric body, a detection resistor that is formed of the same material as any of the individual electrode, the common electrode, and the drive wiring for detecting temperature of the liquid in the pressure chambers, and a first layer that is provided on a surface opposite to a surface facing the pressure chamber substrate in the detection resistor, and has a lower thermal conductivity than the detection resistor. According to the liquid discharge head of the aspect, by providing the low thermal conductive layer on the surface opposite to the surface facing the pressure chamber substrate in the detection resistor, the heat transferred from the liquid in the pressure chamber to the detection resistor can be reduced or prevented from being dissipated from the detection resistor.

(2) In the liquid discharge head of the aspect, the detection resistor may be formed of the same material as the individual electrode. According to the liquid discharge head of the aspect, the detection resistor can be formed together with the individual electrode in a process of forming the individual electrode.

(3) In the liquid discharge head of the aspect, the detection resistor may be formed of Pt. According to the liquid discharge head of the aspect, the temperature detection accuracy by the detection resistor can be improved by applying a material having a large change in electric resistance due to temperature and high stability and accuracy to the detection resistor.

(4) In the liquid discharge head of the aspect, the common electrode may be provided above the piezoelectric body, and the individual electrode may be provided below the piezoelectric body.

(5) In the liquid discharge head of the aspect, the first layer may have a higher specific heat than the detection resistor. According to the liquid discharge head of the aspect, heat transfer from the first layer to the detection resistor can be reduced or suppressed, so that the temperature detection accuracy by the detection resistor can be improved.

(6) In the liquid discharge head of the aspect, the first layer may be made of metal. According to the liquid discharge head of the aspect, the electrode located above the detection resistor and the detection resistor can be electrically coupled via the first layer.

(7) In the liquid discharge head of the aspect, the first layer may be formed of any of Ti, Ni, Cr, Ta, and Nb. According to the liquid discharge head of the aspect, by using a metal material having a low thermal conductivity and a high specific heat, it is possible to form a first layer suitable for temperature detection by the detection resistor.

(8) In the liquid discharge head of the aspect, the thermal conductivity of the first layer may be equal to or less than 130 [W/(m·K)]. According to the liquid discharge head of the aspect, it is possible to form the first layer suitable for the temperature detection by the detection resistor.

(9) In the liquid discharge head of the aspect, the thickness of the first layer may be equal to or larger than 15 nanometers. According to the liquid discharge head of the aspect, it is possible to more reliably reduce or prevent the heat of the liquid in the pressure chamber from being dissipated from the detection resistor.

(10) The liquid discharge head of the aspect may further include a second layer that is provided on a surface facing the pressure chamber substrate in the detection resistor, and has an insulating property. According to the liquid discharge head of the aspect, by forming the detection resistor on the second layer which is the insulating layer, the detection accuracy of the electric resistance value of the detection resistor can be improved and the temperature detection accuracy can be improved.

(11) In the liquid discharge head of the aspect, the second layer may be formed of $ZrO_2$.

(12) In the liquid discharge head of the aspect, a third layer having a higher thermal conductivity than the detection resistor may be provided between the detection resistor and the second layer. According to the liquid discharge head of the aspect, the heat of the liquid in the pressure chamber can be smoothly transferred to the detection resistor via the third layer.

(13) In the liquid discharge head of the aspect, the third layer may be formed of Au. According to the liquid discharge head of the aspect, the adhesion with the second layer and the detection resistor can be further improved.

(14) In the liquid discharge head of the aspect, the third layer may be in contact with the detection resistor via an uneven surface. According to the liquid discharge head of the aspect, the contact space between the third layer and the detection resistor is increased, so that the heat transfer from the third layer to the detection resistor can be made smoother.

(15) In the liquid discharge head of the aspect, a thickness of the third layer may be thinner than a thickness of the first layer. According to the liquid discharge head of the aspect, the heat of the liquid in the pressure chamber can be smoothly transferred to the detection resistor via the third layer while suppressing heat dissipation from the detection resistor.

(16) According to another aspect of the present disclosure, there is provided a liquid discharge device. The liquid discharge device includes the liquid discharge head of the aspect, and a control section that controls a discharge operation of the liquid discharge head.

The present disclosure can also be realized in various aspects other than the liquid discharge device and the liquid discharge head. For example, it is possible to realize the present disclosure with an aspect of a method for manufacturing a liquid discharge head, a method for manufacturing a liquid discharge device, or the like.

The present disclosure is not limited to the ink jet method, and can be applied to any liquid discharge device that discharges a liquid other than the ink and a liquid discharge head that is used for the liquid discharge device. For example, the present disclosure can be applied to the following various liquid discharge devices and liquid discharge heads thereof.

(1) An image recording device such as a facsimile device.

(2) A color material discharge device used for manufacturing a color filter for an image display device such as a liquid crystal display.

(3) An electrode material discharge device used for forming electrodes of an organic Electro Luminescence (EL) display, a Field Emission Display (FED), or the like.

(4) A liquid discharge device that discharges a liquid containing a bioorganic substance used for manufacturing a biochip.

(5) A sample discharge device as a precision pipette.

(6) A lubricating oil discharge device.

(7) A resin liquid discharge device.

(8) A liquid discharge device that discharges lubricating oil with pinpoint to a precision machine such as a watch or a camera.

(9) A liquid discharge device that discharges a transparent resin liquid, such as an ultraviolet curable resin liquid, onto a substrate in order to form a micro hemispherical lens (optical lens) or the like used for an optical communication element or the like.

(10) A liquid discharge device that discharges an acidic or alkaline etching liquid for etching a substrate or the like.

(11) A liquid discharge device including a liquid consumption head that discharges any other minute amount of droplets.

Further, the "liquid" may be any material that can be consumed by the liquid discharge device. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, the following is mentioned as a typical example of a liquid.

(1) Adhesive main agent and curing agent (2) Paint-based paints and diluents, clear paints and diluents (3) Main solvent and diluting solvent containing cells of ink for cells (4) Metallic leaf pigment dispersion liquid and diluting solvent of ink (metallic ink) that develops metallic luster (5) Gasoline/diesel and biofuel for vehicle fuel (6) Main ingredients and protective ingredients of medicine (7) Light Emitting Diode (LED) fluorescent material and encapsulant

What is claimed is:

1. A liquid discharge head comprising:

a pressure chamber substrate that is provided with a plurality of pressure chambers;

an individual electrode that is individually provided for the plurality of pressure chambers;

a common electrode that is commonly provided for the plurality of pressure chambers;

a piezoelectric body that is provided between the individual electrode and the common electrode for applying pressure to liquid in the pressure chambers;

a drive wiring that is electrically coupled to the individual electrode and the common electrode, and applies a voltage for driving the piezoelectric body, a detection resistor that is formed of the same material as any of the individual electrode, the common electrode, and the drive wiring for detecting temperature of the liquid in the pressure chambers; and a first layer that is provided on a surface opposite to a surface facing the pressure chamber substrate in the detection resistor, and has a lower thermal conductivity than the detection resistor, and has electrical conductivity.

2. The liquid discharge head according to claim 1, wherein the detection resistor is formed of the same material as the individual electrode.

3. The liquid discharge head according to claim 1, wherein the detection resistor is formed of Pt.

4. The liquid discharge head according to claim 1, wherein the common electrode is provided above the piezoelectric body, and the individual electrode is provided below the piezoelectric body.

5. The liquid discharge head according to claim 1, wherein the first layer further has a higher specific heat than the detection resistor.

6. The liquid discharge head according to claim 1, wherein the first layer is formed of metal.

7. The liquid discharge head according to claim 6, wherein the first layer is formed of any of Ti, Ni, Cr, Ta, and Nb.

8. The liquid discharge head according to claim 1, wherein a thermal conductivity of the first layer is equal to or less than 130 [W/(m·K)].

9. The liquid discharge head according to claim 1, wherein a thickness of the first layer is equal to or larger than 15 nanometers.

10. The liquid discharge head according to claim 1, further comprising:

a second layer provided on a surface facing the pressure chamber substrate in the detection resistor, and having an insulating property.

11. The liquid discharge head according to claim 10, wherein the second layer is formed of ZrO2.

12. A liquid discharge head comprising:

a pressure chamber substrate that is provided with plurality of pressure chambers;

an individual electrode that is individually provided for the plurality of pressure chambers;

a common electrode that is commonly provided for the plurality of pressure chambers;

a piezoelectric body that is provided between the individual electrode and the common electrode for applying pressure to a liquid in the pressure chambers;

a drive wiring that is electrically coupled to the individual electrode and the common electrode, and applies a voltage for driving the piezoelectric body;

a detection resistor that is formed of the same material as any of the individual electrode, the common electrode, and the drive wiring for detecting temperature of the liquid in the pressure chambers;

a first layer that is provided on a surface opposite to a surface facing the pressure chamber substrate in the detection resistor, and has a lower thermal conductivity than the detection resistor, a second layer provided on a surface facing the pressure chamber substrate in the detection resistor, and having an insulating property; and a third layer having a higher thermal conductivity than the detection resistor is provided between the detection resistor and the second layer.

13. The liquid discharge head according to claim 12, wherein the third layer is formed of Au.

14. The liquid discharge head according to claim 12, wherein the third layer is in contact with the detection resistor via an uneven surface.

15. The liquid discharge head according to claim 12, wherein a thickness of the third layer is thinner than a thickness of the first layer.

16. A liquid discharge device comprising:

the liquid discharge head according to claim 1; and a control section that controls a discharge operation of the liquid discharge head.

* * * * *